(12) United States Patent
Yashiki

(10) Patent No.: US 8,373,395 B2
(45) Date of Patent: Feb. 12, 2013

(54) POWER SOURCE APPARATUS, CONTROL CIRCUIT, AND METHOD OF CONTROLLING POWER SOURCE APPARATUS

(75) Inventor: Makoto Yashiki, Kasugai (JP)

(73) Assignee: Fujitsu Semiconductor Limited, Yokohama (JP)

( * ) Notice: Subject to any disclaimer, the term of this patent is extended or adjusted under 35 U.S.C. 154(b) by 135 days.

(21) Appl. No.: 13/074,782

(22) Filed: Mar. 29, 2011

(65) Prior Publication Data

US 2011/0241632 A1  Oct. 6, 2011

(30) Foreign Application Priority Data

Mar. 31, 2010 (JP) .................................. 2010-81754

(51) Int. Cl.
*G05F 1/595* (2006.01)

(52) U.S. Cl. ........ 323/222; 323/223; 323/224; 323/225; 323/226; 323/270; 323/271; 323/280; 323/281; 323/282; 323/284; 323/285

(58) Field of Classification Search .................. 323/222, 323/223, 224, 225, 226, 270, 271, 280, 282, 323/284, 285

See application file for complete search history.

(56) References Cited

U.S. PATENT DOCUMENTS

| | | | |
|---|---|---|---|
| 7,180,274 B2 * | 2/2007 | Chen et al. | 323/222 |
| 8,242,764 B2 * | 8/2012 | Shimizu et al. | 323/285 |
| 8,274,268 B2 * | 9/2012 | Yen | 323/282 |
| 2005/0286269 A1 | 12/2005 | Groom | |
| 2006/0043943 A1 * | 3/2006 | Huang et al. | 323/222 |
| 2006/0125454 A1 * | 6/2006 | Chen et al. | 323/282 |
| 2007/0120548 A1 * | 5/2007 | Kojima et al. | 323/284 |
| 2007/0252567 A1 * | 11/2007 | Dearn et al. | 323/282 |
| 2007/0296389 A1 * | 12/2007 | Chen et al. | 323/290 |
| 2009/0184701 A1 * | 7/2009 | Yen | 323/283 |
| 2009/0322299 A1 * | 12/2009 | Michishita et al. | 323/282 |
| 2010/0066328 A1 * | 3/2010 | Shimizu et al. | 323/282 |
| 2010/0253309 A1 * | 10/2010 | Xi et al. | 323/288 |

FOREIGN PATENT DOCUMENTS

JP  2008-160905 A  7/2008

* cited by examiner

*Primary Examiner* — Bao Q Vu

(74) *Attorney, Agent, or Firm* — Arent Fox LLP

(57) ABSTRACT

A power source apparatus includes: a switch circuit to receive an input voltage; a control circuit to switch the switch circuit from a second state to a first state at a timing corresponding to a comparison result between a feedback voltage generated based on a first voltage corresponding to an output voltage and a reference voltage generated based on a standard voltage set in accordance with the output voltage; and a voltage generation circuit to add a compensation voltage generated by voltage-converting a time period in which the switch circuit switches from the second state to the first state to one of the first voltage and the standard voltage, to generate the feedback voltage, to add a slope voltage which changes at a slope to one of the first voltage and the standard voltage, and to generate the reference voltage.

12 Claims, 11 Drawing Sheets

POWER SOURCE APPARATUS, CONTROL CIRCUIT, AND METHOD OF CONTROLLING POWER SOURCE APPARATUS

CROSS-REFERENCE TO RELATED APPLICATIONS

This application claims the benefit of priority from Japanese Patent Application No. 2010-81754 filed on Mar. 31, 2010, the entire contents of which are incorporated herein by reference.

BACKGROUND

1. Field

Aspects discussed herein are related to a power source apparatus, a control circuit, and a method of controlling a power source apparatus.

2. Description of Related Art

A step-down DC-DC converter, which generates an output voltage lower than an input voltage, generates the output voltage by smoothing a current flowing through a coil coupled to a switch circuit supplied with an input voltage with a smoothing capacitor. The output voltage includes a ripple voltage, for example, a ripple component, caused by a coil current and an equivalent series resistance of a smoothing capacitor. A comparator in the DC-DC converter compares the output voltage and a certain standard voltage. When the output voltage becomes smaller than the standard voltage or larger than the standard voltage owing to the ripple component, the switch circuit performs switching.

Related art is described in Japanese Laid-open Patent Publication No. 2008-160905, or U.S. Patent Application Serial No. 2005/0286269.

SUMMARY

Aspects include a power source apparatus including a switch circuit to receive an input voltage; a control circuit to switch the switch circuit from a second state to a first state at a timing corresponding to a comparison result between a feedback voltage generated based on a first voltage corresponding to an output voltage and a reference voltage generated based on a standard voltage set in accordance with the output voltage; and a voltage generation circuit to add a compensation voltage generated by voltage-converting a time period in which the switch circuit switches from the second state to the first state to one of the first voltage and the standard voltage, to generate the feedback voltage, to add a slope voltage which changes at a slope to one of the first voltage and the standard voltage, and to generate the reference voltage.

Additional advantages and novel features of the invention will be set forth in part in the description that follows, and in part will become more apparent to those skilled in the art upon examination of the following or upon learning by practice of the invention.

DESCRIPTION OF EMBODIMENTS

The switch circuit may be controlled in a stable manner even when an output voltage includes a small ripple by setting the standard voltage, which is input to the comparator, to a slope voltage that changes at a certain slope, for example.

In a comparator type DC-DC converter, when an input voltage or an output current varies, a switching duty of a switch circuit may vary. For example, when the input voltage increases, the coil current increases, and the output voltage obtained by smoothing the coil current may become large. Since the slope of the slope voltage is substantially constant, an intersection voltage, at which the output voltage becomes substantially equal to the standard voltage, becomes large. Accordingly, the output voltage may be stabilized at a larger voltage than a target voltage. When the input voltage decreases, the output voltage may be stabilized at a voltage smaller than the target voltage.

Figure 1:
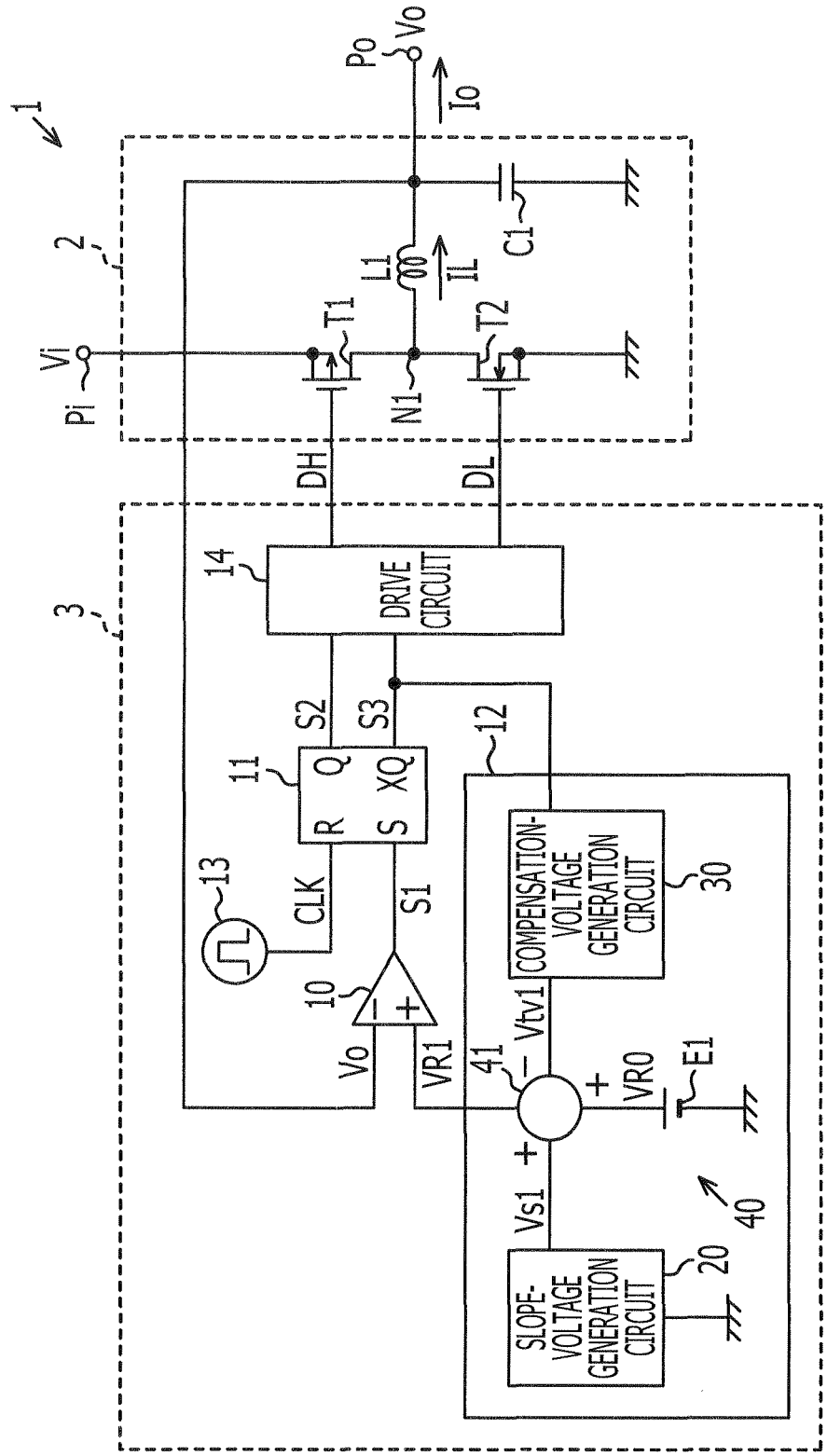
FIG. 1 illustrates an exemplary DC-DC converter.

FIG. 1 illustrates an exemplary DC-DC converter. The DC-DC converter 1 includes a converter 2, which generates an output voltage Vo that is smaller than an input voltage Vi, and a control circuit 3 which controls the converter 2.

The converter unit 2 includes a main-side transistor T1, a synchronous-side transistor T2, a coil L1, and a capacitor C1. The main-side transistor T1 may be a P-channel MOS transistor, and the synchronous-side transistor T2 may be an N-channel MOS transistor. The source of the transistor T1 is coupled to an input terminal Pi which is supplied with an input voltage Vi, and the drain of the transistor T1 is coupled to the drain of the transistor T2. The source of the transistor T2 is coupled to a power source line having a potential smaller than the input voltage Vi, for example, ground. The transistor T1 and the transistor T2 are coupled in series between the input terminal Pi and ground.

The gate of the transistor T1 is supplied with a control signal DH from the control circuit 3, and the gate of the transistor T2 is supplied with a control signal DL from the control circuit 3. The transistors T1 and T2 turn on and off in response to the control signal DH or DL. The control circuit 3 generates the control signals DH and DL so as to turn on and off the transistors T1 and T2 complementarily.

A node N1 between the transistors T1 and T2 is coupled to a first terminal of the coil L1. A second terminal of the coil L1 is coupled to an output terminal Po outputting the output voltage Vo. The main-side transistor T1 and the coil L1 are coupled in series between the input terminal Pi and the output terminal Po. The second terminal of the coil L1 is coupled to a first terminal of a smoothing capacitor C1, and a second terminal of the capacitor C1 is coupled to ground. The capacitor C1 may be included in a smoothing circuit which smoothes the output voltage Vo.

In the converter unit 2, when the main-side transistor T1 turns on and the synchronous-side transistor T2 turns off, a coil current IL in accordance with a potential difference between the input voltage Vi and the output voltage Vo flows through the coil L1. An energy is charged in the coil L1. When the main-side transistor T1 turns off, and the synchronous-side transistor T2 turns on, the coil L1 discharges the charged energy, and thus an induced current, for example, a coil current IL flows through the coil L1. Accordingly, the output voltage Vo, which is a step-down voltage from the input voltage Vi, is generated. The output voltage Vo may be output to a load (not illustrated) coupled to the output terminal Po. The load may be supplied with an output current Io.

The control circuit 3 adjusts pulse widths of the control signals DH and DL based on the output voltage Vo fed back from the converter unit 2. The control circuit 3 includes a comparator 10, an RS-flip-flop circuit (RS-FF circuit) 11, a reference-voltage generation circuit 12, an oscillator 13, and a drive circuit 14.

The inverting input terminal of the comparator 10 is supplied with the output voltage Vo as feedback. The non-inverting terminal of the comparator 10 is supplied with a reference voltage VR1 output from the reference-voltage generation circuit 12. The comparator 10 generates a signal S1 in accordance with a comparison result between the output voltage Vo and the reference voltage VR1. When the output voltage Vo is larger than the reference voltage VR1, the comparator 10 generates a low-level signal S1. When the output voltage Vo is smaller than the reference voltage VR1, the comparator 10 generates an high-level signal S1. The comparator 10 outputs the signal S1 to the RS-FF circuit 11.

The comparator 10 is coupled to the set terminal S of the RS-FF circuit 11, and the oscillator 13 is coupled to the reset terminal R of the RS-FF circuit 11. The oscillator 13 generates a clock signal CLK having a frequency, for example, a pulse signal generated on a certain cycle. The RS-FF circuit 11 outputs an high-level control signal S2 from an output terminal Q in response to the high-level signal S1 supplied to the set terminal S, and outputs an low-level control signal S3 from an inverting output terminal XQ. The RS-FF circuit 11 outputs the low-level control signal S2 in response to the high-level clock signal CLK supplied to the reset terminal R, and outputs the high-level control signal S3. The high-level signal S1 may be a set signal, and the H-level clock signal CLK may be a reset signal. The control signal S2 output from the RS-FF circuit 11 is supplied to the drive circuit 14, and the control signal S3 is supplied to the reference-voltage generation circuit 12 and the drive circuit 14.

The reference-voltage generation circuit 12 generates a slope voltage Vs1 which changes at a certain slope. The reference-voltage generation circuit 12 generates a compensation voltage Vtv1 by voltage-converting an off-time of the main-side transistor T1 based on the control signal S3. The reference-voltage generation circuit 12 adds the slope voltage Vs1 and the compensation voltage Vtv1 to a standard voltage VR0 set in accordance with the output voltage Vo to generate the reference voltage VR1. The reference voltage VR1 is supplied to the comparator 10.

The drive circuit 14 generates control signals DH and DL that complementarily turn on and off the transistors T1 and T2 of the converter unit 2 based on the control signals S2 and S3 from the RS-FF circuit 11. In the drive circuit 14, a dead time may be set for the control signals DH and DL in order to not turn on both of the transistors T1 and T2 substantially contemporaneously.

The drive circuit 14 outputs the low-level control signals DH and DL in response to the high-level control signal S2 and the low-level control signal S3, and outputs the high-level control signals DH and DL in response to the low-level control signal S2 and the high-level control signal S3. The main-side transistor T1 turns on in response to the low-level control signal DH, and turns off in response to the high-level control signal DL. The synchronous-side transistor T2 turns on in response to the high-level control signal DL, and turns off in response to the low-level control signal DL.

The comparator 10 outputs the high-level signal S1 when the output voltage Vo is smaller than the reference voltage VR1. The RS-FF circuit 11 outputs the high-level control signal S2 and the low-level control signal S3 in response to the high-level signal S1. The drive circuit 14 generates the low-level control signals DH and DL in response to the high-level control signal S2 and the L-level control signal S3. The control circuit 3 turns on the main-side transistor T1 and turns off the synchronous-side transistor T2 when the output voltage Vo becomes smaller than the reference voltage VR1. For example, an on-timing of the transistor T1 is set in accordance with a comparison result between the output voltage Vo and the reference voltage VR1.

The oscillator 13 outputs the high-level clock signal CLK on a certain cycle. The RS-FF circuit 11 outputs the low-level control signal S2 and the high-level control signal S3 in response to the high-level clock signal CLK. The drive circuit 14 generates the high-level control signals DH and DL in response to the low-level control signal S2 and the high-level control signal S3. The control circuit 3 turns off the main-side transistor T1, and turns on the synchronous-side transistor T2 on a certain cycle. When the output voltage Vo becomes lower than the reference voltage VR1 again, the control circuit 3 turns on the main-side transistor T1, and turns off the synchronous-side transistor T2.

The control circuit 3 generates the low-level control signal DH for switching the main-side transistor T1 from on to off on a certain cycle. The control circuit 3 generates the high-level control signal DH for switching the transistor T1 from off to on in accordance with the comparison result between the output voltage Vo and the reference voltage VR1. The control circuit 3 changes the timing at a time when generating the high-level control signal DH, for example, the on-timing of the transistor T1 by adjusting the reference voltage VR1.

The cycle of the control signal DH for controlling the main-side transistor T1 may be the cycle of the switching operation of the DC-DC converter 1, for example, the switching cycle (switching frequency). A time period in which the main-side transistor T1 is on may be referred as "on time" Ton, and a time period in which the transistor T1 is off may be referred as "off time" Toff.

The reference-voltage generation circuit 12 illustrated in FIG. 1 includes a slope-voltage generation circuit 20, a compensation-voltage generation circuit 30, and an addition circuit 40.

Figure 2A:
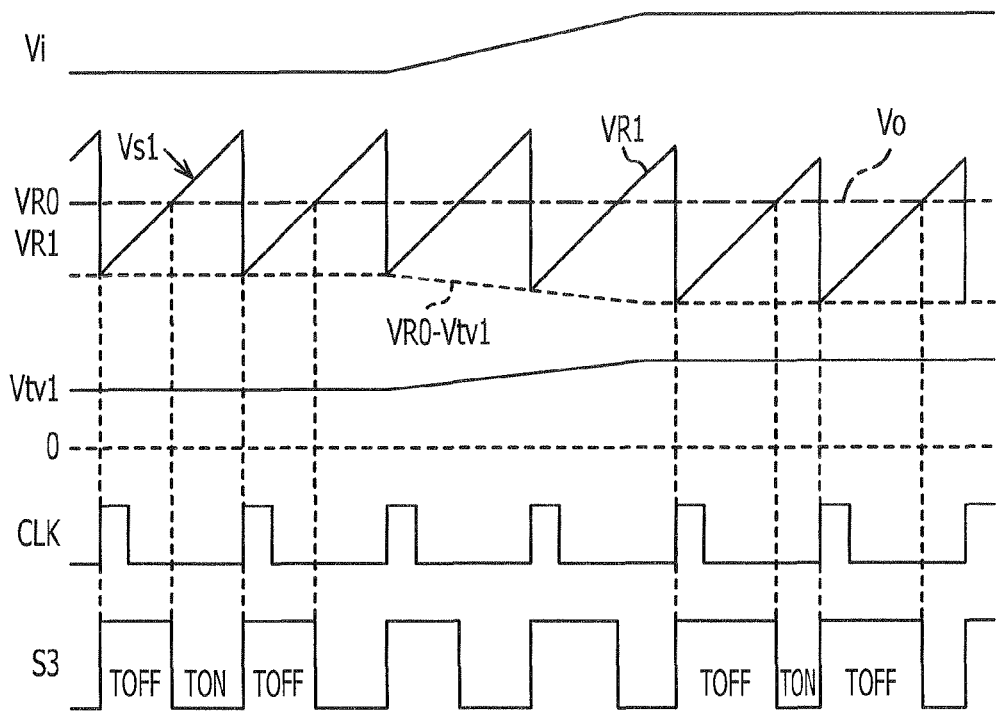
FIG. 2A and FIG. 2B illustrate an exemplary operation of a reference-voltage generation circuit.

The slope-voltage generation circuit 20 generates a slope voltage Vs1 whose voltage changes in synchronization with the clock signal CLK generated by the oscillator 13. For example, as illustrated in FIG. 2A, in a switching cycle of the main-side transistor, the slope voltage Vs1 increases from a reset voltage, for example, from 0 V at a certain slope, and is reset to the reset voltage in synchronization with a rising edge of the clock signal CLK. The slope voltage Vs1 increases at a certain slope in synchronization with the off-timing of the main-side transistor T1. As illustrated in FIG. 1, the slope-voltage generation circuit 20 outputs the generated slope voltage Vs1 to the addition circuit 40.

The compensation-voltage generation circuit 30 is supplied with the control signal S3 output from the inverting output terminal XQ from the RS-FF circuit 11. The compensation-voltage generation circuit 30 voltage-converts a high-level pulse time of the control signal S3 to generate the compensation voltage Vtv1. For example, since the main-side transistor T1 turns off during a time period in which the high-level control signal S3 or the low-level control signal S2 is output, the high-level pulse time of the control signal S3 may correspond to the off-time of the transistor T1. Accordingly, the compensation voltage Vtv1 may be a voltage proportional to the off-time Toff of the main-side transistor T1. As illustrated in FIG. 2A, the compensation voltage Vtv1 increases as the off-time Toff of the transistor T1 becomes long. The compensation-voltage generation circuit 30 outputs the generated compensation voltage Vtv1 to the addition circuit 40.

The addition circuit 40 includes a standard power source E1 and an addition/subtraction circuit 41. The addition/subtraction circuit 41 is supplied with a standard voltage VR0 generated by the standard power source E1, the slope voltage Vs1, and the compensation voltage Vtv1. The addition/subtraction circuit 41 adds the slope voltage Vs1 to the standard voltage VR0, and subtracts the compensation voltage Vtv1 so as to generate the reference voltage VR1. The reference voltage VR1 is supplied to the non-inverting input terminal of the comparator 10. The standard voltage VR0 may be set in accordance with a target voltage of the output voltage Vo.

Figure 2B:
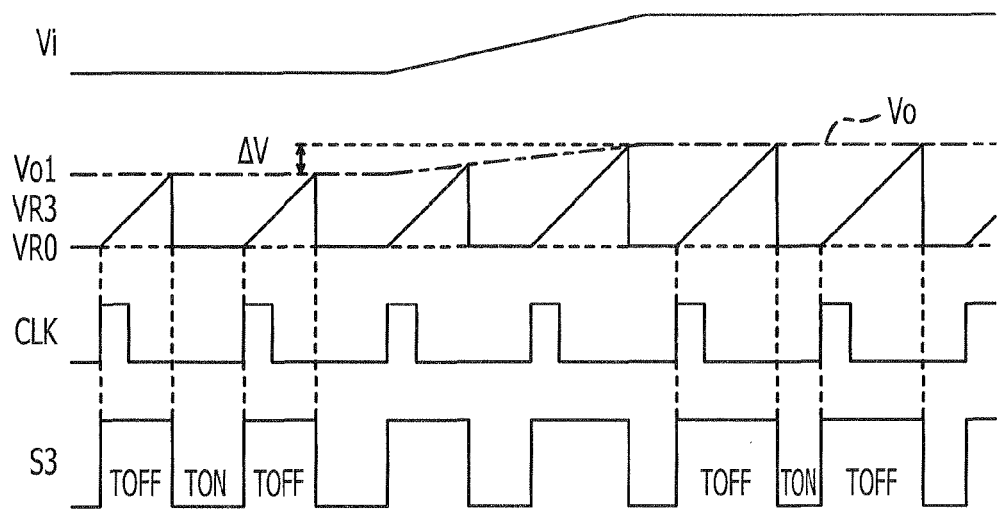
Figure 3A:
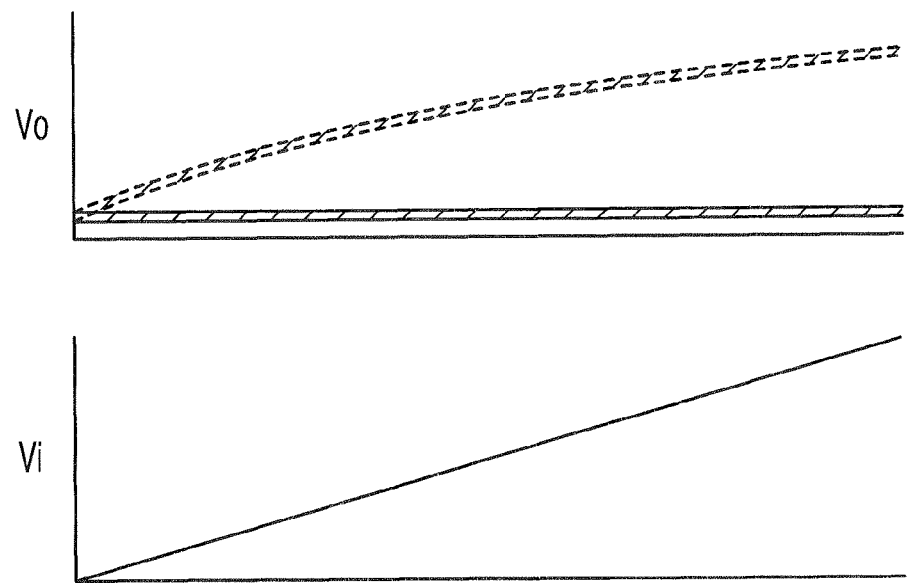
FIG. 3A and FIG. 3B illustrate an exemplary simulation result.
Figure 3B:
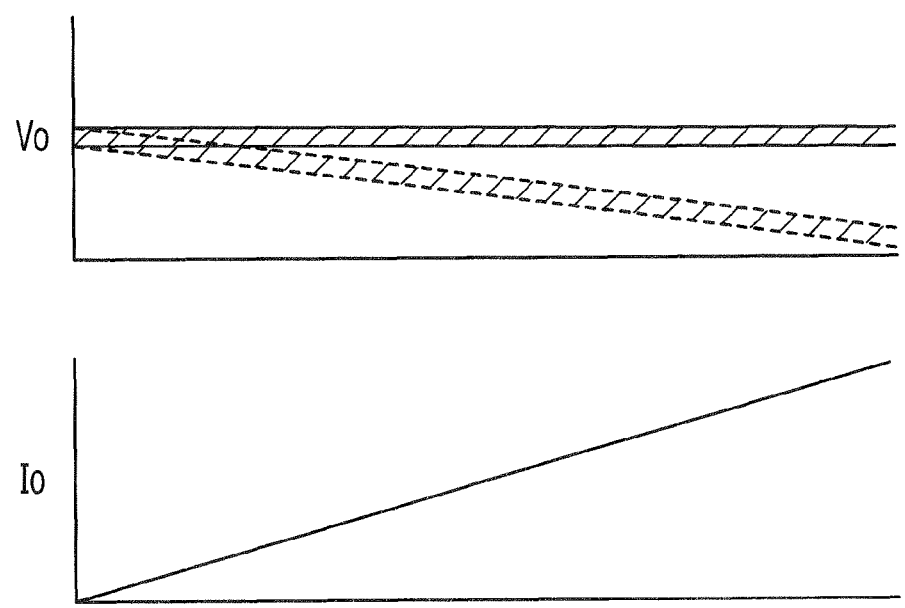

FIG. 2A and FIG. 2B illustrate an exemplary operation of a reference-voltage generation circuit. The operations illustrated in FIG. 2A and FIG. 2B may be operations of the reference-voltage generation circuit 12 illustrated in FIG. 1. The vertical axis and the horizontal axis are suitably expanded or contracted. FIG. 3A and FIG. 3B illustrate an exemplary simulation result. In FIG. 3A, the output voltage Vo is set to 1 V, the output current Io is set to 0.5 A, the coil L1 is set to 1.5 µH, the capacitor C1 is set to 10 µF, the switching frequency is set to 3 MHz, and the input voltage Vi changes from 2.5 V to 5.5 V. In FIG. 3B, the output voltage Vo is set to 1 V, the input voltage Vi is set to 3.6 V, the coil L1 is set to 1.5 µH, the capacitor C1 is set to 10 µF, the switching frequency is set to 3 MHz, and the output current Io changes from 0 A to 1 A.

As illustrated in FIG. 2A and FIG. 2B, when the input voltage Vi increases, the on-time Ton of the transistor T1 becomes short, and the off-time Toff becomes long. For example, when the reference voltage VR1 becomes larger than the output voltage Vo, the comparator 10 illustrated in FIG. 1 outputs the high-level signal S1. The transistor T1 turns on based on the signal S1. For example, the transistor T1 turns on at an intersection point between the waveform of the output voltage Vo and the waveform of the reference voltage VR1. A time period from the time when the transistor T1 is turned off based on the high-level clock signal CLK to the intersection point may correspond to the off-time Toff.

If the off-time Toff becomes long with an increase in the input voltage Vi, when the reference voltage VR3, to which a slope voltage having a certain slope with respect to the standard voltage VR0 is added, is compared with the output voltage Vo, the output voltage Vo when the output voltage Vo is substantially equal to the reference voltage VR3 becomes large (refer to the right part of FIG. 2B). For example, when the standard voltage VR0 is substantially constant and the slope of the reference voltage VR3 has a certain value, the amount of change in the voltage of the reference voltage VR3 becomes by the amount of the off-time Toff which becomes longer during the off period. Accordingly, the output voltage Vo when it becomes substantially equal to the reference voltage VR3 may become large. The output voltage Vo when it becomes substantially equal to the reference voltage VR3 varies depending on the off time Toff. As illustrated in the simulation result in FIG. 3A (refer to a dashed-line waveform), the output voltage Vo varies in accordance with the variation of the input voltage Vi, for example, the variation of the off-time Toff. In the simulation result illustrated in FIG. 3A, when the input voltage Vi increases from 2.5 V to 5.5 V, the output voltage Vo increases from 1 V, which is a target voltage, by 16 mV, and thus the voltage variation becomes 1.6%.

The slope voltage Vs1 having a certain slope with respect to the standard voltage VR0 and the compensation voltage Vtv1, which changes proportionally to the off-time Toff of the transistor T1, are added to the reference voltage VR1. As illustrated in FIG. 2A, when the off-time Toff becomes long with an increase in input voltage Vi, the compensation voltage Vtv1 increases by the same amount as the amount of increase in the off-time Toff. The compensation voltage Vtv1 is subtracted from the standard voltage VR0. For example, the reference voltage VR1 when switching from on-period to off-period, for example, the reference voltage VR1 when the slope voltage Vs1 is at a reset voltage becomes lower in the case where the input voltage V1 is high and the off-time Toff is long (refer to the right part) than in the case where the input voltage Vi is low and the off-time Toff is short (refer to the left part of FIG. 2A). Accordingly, even if the off time Toff becomes long with an increase in input voltage Vi, the voltage of the output voltage Vo may not increase by the amount of increase in the compensation voltage Vtv1, for example, the amount of decrease in the reference voltage VR1.

In the reference-voltage generation circuit 12, since the compensation voltage Vtv1 depending on the off-time Toff of the transistor T1 is subtracted from the standard voltage VR0, the output voltage Vo when it becomes substantially equal to the reference voltage VR1 may not depend on the off-time Toff. For example, the reference-voltage generation circuit 12 voltage-converts the off-time Toff to the compensation voltage Vtv1 so that the compensation voltage Vtv1 becomes substantially equal to the amount of variation of the slope voltage Vs1 during the off-period of the transistor T1, for example, the amount of an increase, and subtracts the compensation voltage Vtv1 from the standard voltage VR0. As illustrated by a dash-single-dot line in FIG. 2A, even if the input voltage Vi varies, variation of the output voltage Vo with the variation of the input voltage Vi is reduced as illustrated by a solid-line waveform in FIG. 3A. In the simulation result illustrated in FIG. 3A, the input voltage Vi may increase from 2.5 V to 5.5 V, the output voltage Vo may increase from 1 V, which is the target voltage, by 0.2 mV, and the voltage variation may become 0.02%. In the DC-DC converter 1 illustrated in FIG. 1, when the input voltage Vi varies, a certain output voltage Vo is generated.

As illustrated in FIG. 2B, when the input voltage Vi increases from a state where the output voltage Vo is a voltage Vo1, the output voltage Vo is stabilized at voltage Vo1+ΔV. As illustrated in FIG. 2A, in the DC-DC converter 1 illustrated in FIG. 1, when the input voltage Vi increases from the voltage Vo1, for example, the standard voltage VR0, the output voltage Vo is stabilized at the voltage Vo1. In the DC-DC converter 1, since the output voltage Vo is decreased by a voltage ΔV after an increase in the input voltage Vi, the on-duty may become small. The reference-voltage generation circuit 12 generates the reference voltage VR1, for example, the compensation voltage Vtv1 so that the output voltage Vo is stabilized at the voltage Vo1 (=VR0) and the on-duty becomes small. As illustrated in FIG. 2A, the variation of the output voltage Vo with the variation of the input voltage Vi may be reduced.

When the input voltage Vi decreases, the variation of the output voltage Vo may be reduced.

When the output current Io increases with an increase in load, as illustrated by a broken-line waveform in FIG. 3B, the output voltage Vo decreases as the output current Io increases. For example, when the output current Io increases, a voltage VN1 of a node N1 during the on-period decreases due to an on-resistor Rt1 of the transistor T1. The voltage VN1 of the node N1 during the on-period may be expressed by the following equation.

$$VN1 = Vi - Io \times Rt1$$

Energy stored in the coil L1 is decreased as the output current Io increases. The voltage VN1 of the node N1 during the off-period decreases due to an on-resistor Rt2 of the transistor T2. The voltage VN1 of the node N1 during the off period may be expressed by the following equation.

$$VN1 = -Io \times Rt2$$

Energy stored in the coil L1 is increased as the output current Io increases. The output voltage Vo decreases as the output current Io increases.

If the output current Io increases, the on-time Ton of the transistor T1 becomes long, and the off-time Toff becomes short. If the off-time Toff becomes short, the standard voltage VR0 is substantially constant, and the reference voltage VR3 has a certain slope, the output voltage Vo when it becomes substantially equal to the reference voltage VR3 decreases by the decrease of the off-time Toff. Accordingly, the output voltage Vo decreases as the-off time becomes short with an increase in the time output current Io. For example, in the simulation result, when the output current Io increase from 0 A to 1 A, the output voltage Vo may decrease from 1 V, which is the target voltage, by 4.5 mV, and the voltage variation may be 0.45%.

The compensation voltage Vtv1 is generated by voltage-converting the off-time Toff which changes with an increase in the output current Io. The reference voltage VR1 is generated by adding the compensation voltage Vtv1 and the slope voltage Vs1 to the standard voltage VR0. When the off-time Toff of the transistor T1 becomes short with an increase in output current Io, the compensation voltage Vtv1 may decrease by the amount corresponding to the decrease in the off-time Toff becoming short. Since the reference voltage VR1 when changing from the on-period to the off-period increases by the amount corresponding to a decrease in the compensation voltage Vtv1, the output voltage Vo may not increase. As illustrated by a solid-line waveform in FIG. 3B, the variation of the output voltage Vo with the variation of the output current Io (load) may be reduced. For example, in the simulation result, when the output current Io increases from 0 A to 1 A, the output voltage Vo may decrease from 1 V, which is the target voltage, by 0.2 mV, and the voltage variation may become 0.02%. In the DC-DC converter 1 illustrated in FIG. 1, even if the output current Io varies, a substantially constant output voltage Vo may be generated.

For example, at an intersection point between the waveform of the output voltage Vo and the waveform of the reference voltage VR1, the transistor T1 may turn on. Accordingly, the output voltage Vo when the transistor T1 turns on may be substantially equal to the reference voltage VR1. The output voltage Vo when the transistor T1 turns on may be expressed by the following equation.

$$Vo = VR0 + Vs1 - Vtv1 \quad (1)$$

When an amount of voltage change per unit time is a, an amount of voltage change $\Delta Vs1$ of the slope voltage Vs1 during the off-period of the transistor T1 is expressed by the following equation.

$$\Delta Vs1 = a \times Toff \quad (2)$$

An amount of voltage change $\Delta Vs1$ may corresponds to the slope voltage Vs1 of the ontiming of the transistor T1. When a gain of time-voltage conversion is b, the compensation voltage Vtv1 may be expressed by the following equation.

$$Vtv1 = b \times Toff \quad (3)$$

By substituting Equation 2 and Equation 3 in Equation 1, the following equation is obtained.

$$Vo = VR0 + a \times Toff - b \times Toff$$

In the reference-voltage generation circuit 12, an amount of voltage change of the slope voltage Vs1 during the off-period of the transistor T1 may be set to be substantially equal to the compensation voltage Vtv1.

$$a = b$$

The output voltage Vo may be expressed as follows.

$$Vo = VR0$$

The output voltage Vo when the term of the input voltage Vi or the off-time Toff is canceled and the transistor T1 is turned on may be substantially equal to the standard voltage VR0 (a constant voltage). Accordingly, the output voltage Vo may not depend on the input voltage Vi and the off-time Toff. As illustrated in FIG. 2A and FIG. 3A, the DC-DC converter 1 illustrated in FIG. 1 generates a stable output voltage Vo even if the input voltage Vi varies. As illustrated in FIG. 3B, the DC-DC converter 1 may generate a stable output voltage Vo even if the load varies.

The reference-voltage generation circuit 12 generates the reference voltage VR1 by adding the compensation voltage Vtv1 generated by voltage-converting the off-time Toff of the transistor T1 and the slope voltage Vs1, which changes at a certain slope to the standard voltage VR0. Therefore, the compensation voltage Vtv1 that depends on the off-time Toff of the transistor T1, which changes with variations of the input voltage Vi and the output current Io, is added to the standard voltage VR0. For example, when the off time Toff becomes long and a change in the slope voltage Vs1 during the off-period becomes large, the compensation voltage Vtv1 becomes small in response to the variation. Thus, if the input voltage Vi and the output current Io vary, the variation of the output voltage Vo is reduced. Accordingly, the output voltage Vo may be stabilized.

The reference-voltage generation circuit 12 generates the compensation voltage Vtv1 so that the compensation voltage Vtv1 becomes a voltage corresponding to the change of the slope voltage Vs1 during the off-period of the transistor T1. Accordingly, the output voltage Vo may become substantially equal to the standard voltage VR0. The output voltage Vo becomes a voltage that is not dependent on the input voltage Vi or the output current Io, and variations of the output voltage Vo with variations of the input voltage Vi or the output current Io are reduced. Since the output voltage Vo becomes substantially equal to the standard voltage VR0, the target voltage of the output voltage Vo may be easily set.

The control circuit 3 may not use a ripple component of the output voltage Vo in order to stabilize the output voltage Vo. A capacitor having a small equivalent series resistance value, for example, a multilayer ceramic capacitor, may be used for the smoothing capacitor C1. Thus, the DC-DC converter 1 is miniaturized and the cost is reduced.

Figure 4:
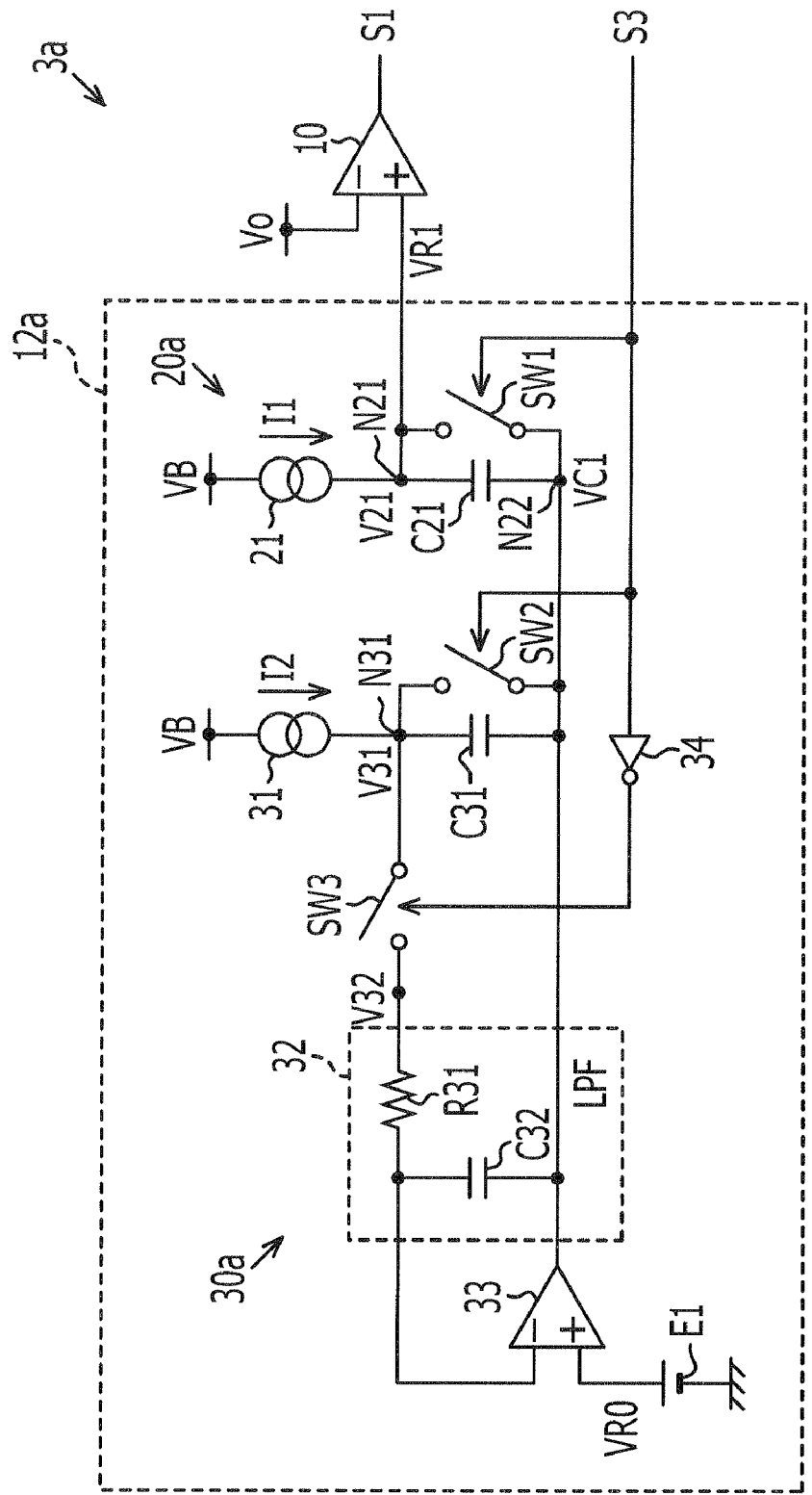
FIG. 4 illustrates an exemplary reference-voltage generation circuit.

FIG. 4 illustrates an exemplary control circuit. The reference-voltage generation circuit 12a in the control circuit 3a includes a slope-voltage generation circuit 20a and a compensation-voltage generation circuit 30a. The slope-voltage generation circuit 20a includes a current source 21, a capacitor C21, and a switch SW1. A constant current flows from the current source 21. A first terminal of the current source 21 is supplied with a bias voltage VB, and a first terminal of the capacitor C21 is coupled to a second terminal of the current source 21. The second terminal of the capacitor C21 is coupled to a node N22. The bias voltage VB may be, for example, a voltage generated by a power source circuit not illustrated in the figure, or the input voltage Vi.

The node N21 between the current source 21 and the capacitor C21 is coupled to the non-inverting input terminal of the comparator 10 and a first terminal of a switch SW1. A second terminal of the switch SW1 is coupled to the node N22. The switch SW1 is coupled in parallel with the capacitor C21.

The control terminal of the switch SW1 is supplied with a control signal S3 output from an inverting output terminal XQ of the RS-FF circuit 11 illustrated in FIG. 1. When the control signal S3 is a high level, the switch SW1 turns off, and when the control signal S3 is a low level, the switch SW1 turns on. For example, the switch SW1 turns on during the on-period of the main-side transistor T1, and turns off during the off-period of the transistor T1. The switch SW1 turns on and off in synchronization with the main-side transistor T1.

Figure 5:
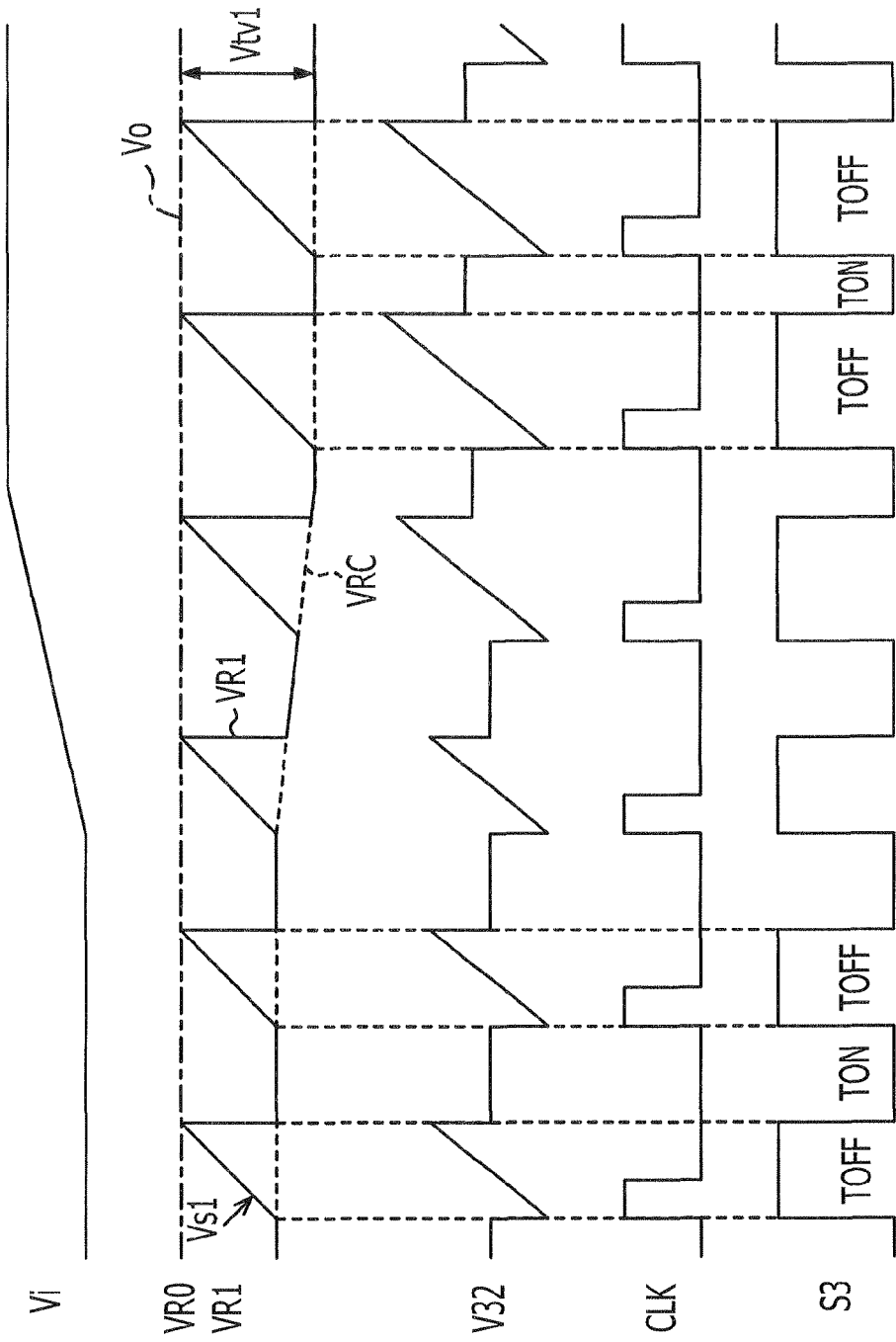
FIG. 5 illustrates an exemplary operation of a reference-voltage generation circuit.

FIG. 5 illustrates an exemplary reference-voltage generation circuit. If the switch SW1 is turned off, for example, if the transistor T1 is turned off, the capacitor C21 is charged by the constant current I1 supplied from the current source 21. During the off-period of the transistor T1, a voltage V21 of the node N21 increases at a certain slope, for example, I1/C21. As shown in FIG. 5, a voltage increasing at a certain slope during the off-period, for example, the voltage corresponding to the slope voltage Vs1 is added to the compensated standard voltage VC1 of the node N22, and the added voltage V21 of the node N21 is supplied to the comparator 10 as the reference voltage VR1. The reference voltage VR1 during the off period may be expressed by the following equation.

$$VR1 = VC1 + \frac{I1}{C21} \times Toff \tag{4}$$

When the switch SW1 is turned on, for example, when the transistor T1 is turned on, both terminals of the capacitor C21 are shorted. Thus, the charge stored in the capacitor C21 is discharged, the first terminal of the capacitor C21, for example, a voltage V21 of the node N21 is reset to the compensated standard voltage VC1. The reference voltage VR1 during the on period may be substantially equal to the compensated standard voltage VC1.

The compensation-voltage generation circuit 30a compensates the standard voltage VR0 for a voltage dependent on the off-time Toff of the transistor T1 to generate the compensated standard voltage VC1. The compensation-voltage generation circuit 30a includes a current source 31, a capacitor C31, switches SW2 and SW3, a low-pass filter (LPF) 32, an operational amplifier 33, an inverter circuit 34, and a standard power source E1. A constant current I2 having a current value substantially equal to that of the constant current I1 flows from the current source 31. A first terminal of the current source 31 is supplied with a bias voltage VB. A first terminal of the capacitor C31 is coupled to the second terminal of the current source 31. The second terminal of the capacitor C31 is coupled to a node N22. The capacitance of the capacitor C31 may be set to ½ the capacitance of the capacitor C21.

A node N31 between the current source 31 and the capacitor C31 is coupled to the first terminal of the switch SW2. The second terminal of the switch SW2 is coupled to the node N22. The switch SW2 is coupled in parallel with the capacitor C31. The control terminal of the switch SW2 is supplied with the above-described control signal S3. The switch SW2 turns on and off in synchronization with the main-side transistor T1 in the same manner as the switch SW1.

When the switch SW2 is turned off, for example, when the transistor T1 is turned off, the capacitor C31 is charged with the constant current I2 supplied from the current source 31. Thus, during the off-period of the transistor T1, a voltage V31 of the node N31 increases at a certain slope, for example, I2/C31. When the switch SW2 is turned on, for example, when the transistor T1 is turned on, both terminals of the capacitor C31 are shorted. Accordingly, the charge stored in the capacitor C31 is discharged, the first terminal of the capacitor C31, for example, a voltage V31 of the node N31 is reset to a voltage level VC1 of the node N22.

The node N31 between the current source 31 and the capacitor C31 is coupled to the first terminal of the switch SW3. The second terminal of the switch SW3 is coupled to the first terminal of a resistor R31 in the LPF 32. For example, the node N31 is coupled to the LPF 32 through the switch SW3. The control terminal of the switch SW3 is supplied with the control signal S3 through the inverter circuit 34. The switch SW3 is turned on when the control signal S3 is a high H level, and is turned off when the control signal S3 is a low level. The switch SW3 is turned off during the on-period of the main-side transistor T1, and is turned on during the off-period of the transistor T1. The switch SW3 may be turned on/off complementarily to the main-side transistor T1.

The second terminal of the resistor R31 is coupled to the first terminal of the capacitor C32 and the inverting input terminal of the operational amplifier 33. The second terminal of the capacitor C32 is coupled to the output terminal of the operational amplifier 33. The non-inverting input terminal of the operational amplifier 33 is supplied with the standard voltage VR0, and the output terminal of the operational amplifier 33 is coupled to the node N22. The operational amplifier 33 changes the output voltage, for example, the compensated standard voltage VC1 so that the voltage of the connection point between the resistor R31 and the capacitor C32 becomes substantially equal to the standard voltage VR0.

The LPF 32 including the resistor R31 and the capacitor C32 calculates a cumulative average of the V31 and V32 based on the stored charge of the capacitor C31 while the voltage switch SW3 is on, for example, during the off-period of the transistor T1. The LPF 32 smoothes the voltage V32 increasing at a certain slope during the off period, for example, I2/C31. The voltage difference between both terminals of the capacitor C32 may be ½ the voltage difference between both terminals of the capacitor C31. When the switch SW3 is turned off, the capacitor C31 and the LPF 32 is separated, and thus the LPF 32 may not be affected by a discharging voltage of the capacitor C31 during the on-period of the transistor T1. The voltage V32 of the second terminal of the switch SW3 is held at the smoothed voltage during the off period. Accordingly, a voltage dependent on the off-time Toff of the transistor T1 is fed back to the operational amplifier 33. The compensated standard voltage VC1 generated by the operational amplifier 33 may be a voltage dependent on the off-time Toff of the transistor T1. The compensated standard voltage VC1 may be expressed by the following equation.

$$VC1 = VR0 - \frac{I2}{2 \times C31} \times Toff \tag{5}$$

The compensated standard voltage VC1 may be a voltage generated by subtracting a voltage generated by voltage conversion on the off-time Toff, for example, a voltage corresponding to the compensation voltage Vtv1, from the standard voltage VR0. In the DC-DC converter illustrated in FIG.

1, as illustrated in FIG. 5, when the off-time Toff becomes long with an increase in the input voltage Vi, the compensated standard voltage VC1 may be decreased as much as the amount of the prolonged off-time Toff, for example, the increased amount of voltage change of the slope voltage Vs1. The output voltage Vo may not increase, or variations of the output voltage Vo with variations of the input voltage Vi may be reduced.

Since the output voltage Vo when the transistor T1 turns on becomes substantially equal to the reference voltage VR1, the output voltage Vo may be expressed by the following equation using Equation 4 and Equation 5.

$$Vo = VR0 - \left(\frac{I2}{2 \times C31} \times Toff\right) + \left(\frac{I1}{C21} \times Toff\right)$$

In the reference-voltage generation circuit 12a, the setting may be as follows.

$$C31 = \frac{1}{2} \times C21$$
$$I1 = I2$$

The output voltage Vo may be expressed as follows.

$$Vo = VR0$$

The reference-voltage generation circuit 12a illustrated in FIG. 4 may have an effect that is substantially the same as or similar to that of the reference-voltage generation circuit 12 illustrated in FIG. 1.

Figure 6:
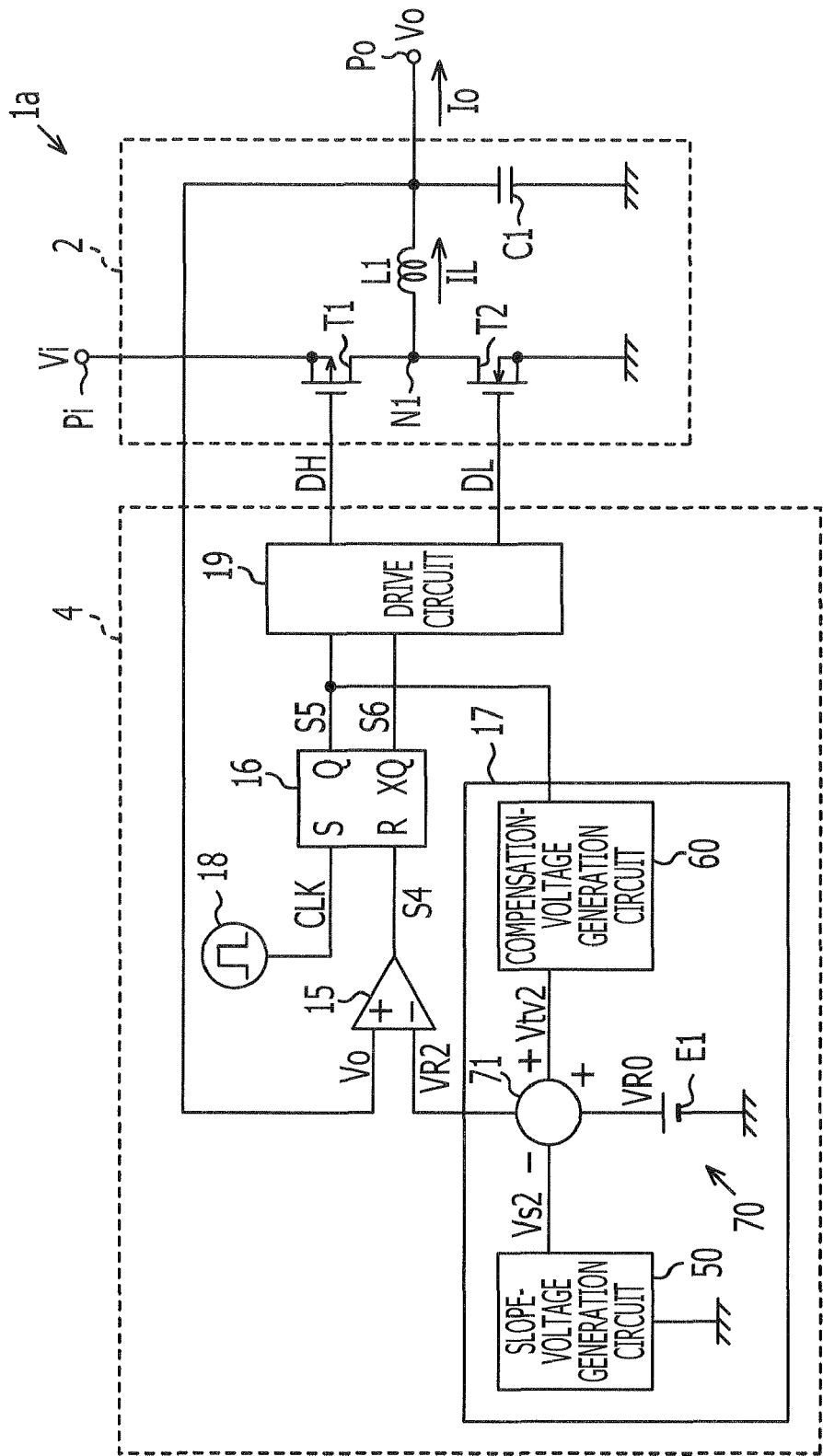
FIG. 6 illustrates an exemplary DC-DC converter.

FIG. 6 illustrates an exemplary DC-DC converter. The DC-DC converter 1 illustrated in FIG. 1 may be a bottom-detection-comparator system DC-DC converter, in which the on-timing of the main-side transistor T1 is set in accordance with the comparison result between the output voltage Vo and the reference voltage VR1. The DC-DC converter 1a illustrated in FIG. 6 may be a peak-detection-comparator system DC-DC converter, in which the off timing of the main-side transistor T1 is set in accordance with the comparison result between the output voltage Vo and the reference voltage VR2.

The control circuit 4 of the DC-DC converter 1a illustrated in FIG. 6 includes a comparator 15, an RS-FF circuit 16, a reference-voltage generation circuit 17, an oscillator 18, and a drive circuit 19. The comparator 15 generates a signal S4 corresponding to the comparison result between the output voltage Vo and the reference voltage VR2 generated by the reference-voltage generation circuit 17. For example, the comparator 15 generates a high-level signal S4 when the output voltage Vo is higher than the reference voltage VR2, and outputs the signal S4 to the reset terminal R of the RS-FF circuit 16.

The RS-FF circuit 16 outputs a low-level control signal S5 and a high-level control signal S6 in response to the high-level signal S4. The drive circuit 19 generates the high-level control signals DH and DL in response to the low-level control signal S5 and the low-level control signal S6. When the output voltage Vo becomes higher than the reference voltage VR2, the control circuit 4 turns off the main-side transistor T1, and turns on the synchronous-side transistor T2. For example, the off-timing of the transistor T1 may be set in accordance with the comparison result of the output voltage Vo and the reference voltage VR1.

The RS-FF circuit 16 outputs the high-level control signal S5 and the low-level control signal S6 in response to the high-level clock signal CLK input from the oscillator 18. The drive circuit 19 generates the low-level control signals DH and DL in response to the high-level control signal S5 and the low-level control signal S6. The control circuit 4 turns on the main-side transistor T1 and turns off the synchronous-side transistor T2 on a certain cycle.

The reference-voltage generation circuit 17 includes a slope-voltage generation circuit 50, a compensation-voltage generation circuit 60, and an addition circuit 70.

In a switching cycle of the main-side transistor T1, the slope-voltage generation circuit 50 generates a slope voltage Vs2 which increases from a reset voltage, for example, 0 V at a certain slope, and is reset to a reset voltage in synchronization with a rising edge of the clock signal CLK. The slope voltage Vs2 increases at a certain slope in synchronization with the on-timing of the main-side transistor T1. The slope-voltage generation circuit 50 outputs the slope voltage Vs2 to an addition/subtraction circuit 71 in the addition circuit 70.

Figure 7A:
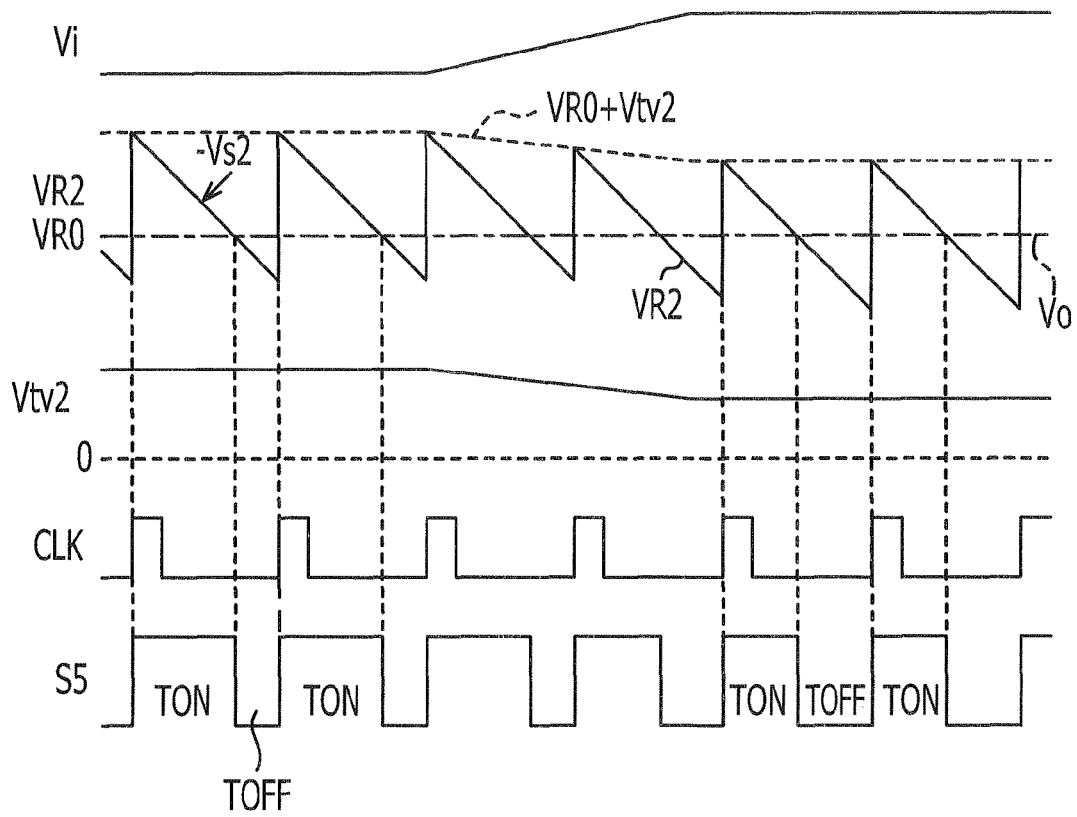
FIG. 7A and FIG. 7B illustrate an exemplary operation of a reference-voltage generation circuit.
Figure 7B:
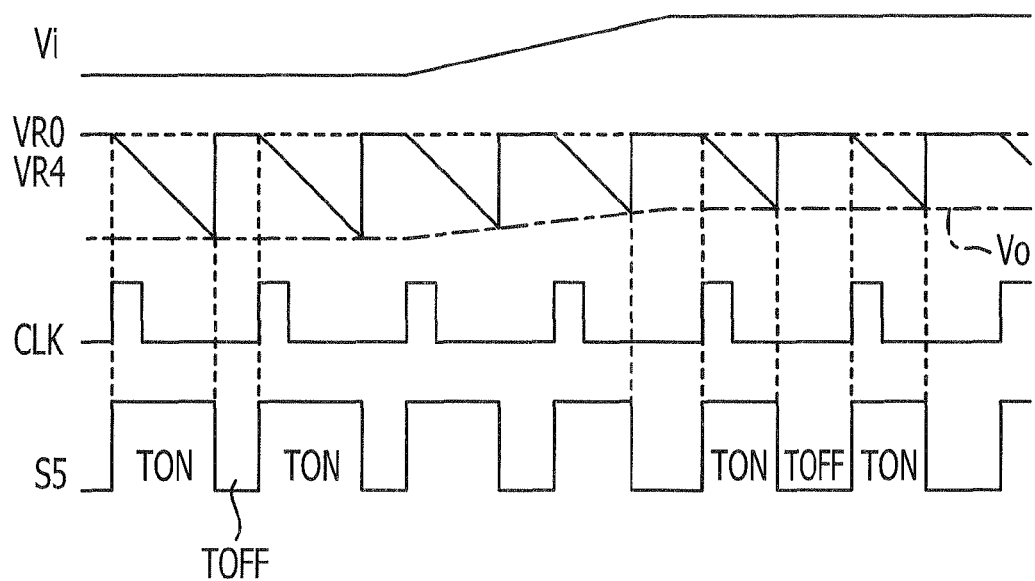

The compensation-voltage generation circuit 60 is supplied with the control signal S5 output from the output terminal Q of the RS-FF circuit 16. The compensation-voltage generation circuit 60 voltage-converts the high-level pulse time of the control signal S5 based on the control signal S5 to generate the compensation voltage Vtv2. Since the main-side transistor T1 turns on during the period when the high-level control signal S5 is output, the high-level pulse time of the control signal S5 may corresponds to the on-time Ton of the transistor T1. Accordingly, the compensation voltage Vtv2 may be proportional to the on-time Ton of the main-side transistor T1. FIG. 7A and FIG. 7B illustrate an exemplary operation of a reference-voltage generation circuit. The operations illustrated in FIG. 7A and FIG. 7B may be performed by the reference-voltage generation circuit illustrated in FIG. 6. The vertical axis and the horizontal axis illustrated in FIG. 7A and FIG. 7B may be suitably expanded or contracted. As illustrated in FIG. 7A, the longer the on-time Ton of the transistor T1, the higher the compensation voltage Vtv2. The compensation-voltage generation circuit 60 outputs the compensation voltage Vtv2 to the addition/subtraction circuit 71.

The addition/subtraction circuit 71 in the addition circuit 70 subtracts the slope voltage Vs2 from the reference voltage VR0 and adds the compensation voltage Vtv2 to the standard voltage VR0 to generate the reference voltage VR2. As illustrated in FIG. 7A, the reference voltage VR2 decreases in accordance with a slope of the slope voltage Vs2 from the voltage obtained by adding the compensation voltage Vtv2 to the standard voltage VR0 in synchronization with the rising edge of the clock signal CLK. The reference voltage VR2 is supplied to the inverting input terminal of the comparator 15.

As illustrated in FIGS. 7A and 7B, when the input voltage V1 increases, the on-time Ton of the transistor T1 becomes short, and the off-time Toff becomes long. For example, when the output voltage Vo becomes lower than the reference voltage VR2, the comparator 15 illustrated in FIG. 6 outputs the high-level signal S4. The transistor T1 turns off based on the signal 34. When the output voltage Vo and the reference voltage VR2 become substantially equal, the transistor T1 turns off. Accordingly, the time period from when the transistor T1 turns on based on the high-level clock signal CLK to when the output voltage Vo and the reference voltage VR2 becomes substantially equal corresponds to the on-time Ton.

If the on-time Ton becomes short with an increase in the input voltage Vi, the output voltage Vo when it becomes substantially equal to the reference voltage VR4 becomes high (refer to FIG. 7B) when the reference voltage VR4 obtained by adding a slope voltage having a negative slope with respect to the standard voltage VR0 is compared with the output voltage Vo. For example, since the standard voltage VR0 is substantially constant, and the slope of the reference voltage VR4 is fixed, the amount of variation of the reference voltage VR4 reduces by the amount of a decrease in the on-time Ton. Accordingly, the output voltage Vo when it becomes substantially equal to the reference voltage VR4 becomes high. The output voltage Vo varies in response to variations of the input voltage Vi, for example, variations of the off-time Toff.

The reference voltage VR2 is generated by adding the compensation voltage Vtv2 obtained by voltage-converting the on-time Ton, which changes with an increase in the input voltage V1, and the slope voltage Vs2 to the standard voltage VR0. When the on-time Ton of the transistor T1 becomes short with an increase in the input voltage Vi, the compensation voltage Vtv2 may become low by the same amount as the amount of a decrease of the off-time, for example, a decrease in the amount of voltage change of the slope voltage Vs2 during the on-period. Since the compensation voltage Vtv2 becomes low, the reference voltage VR2 decreases when changing from the on-period to the-off period. Accordingly, the voltage when the reference voltage VR2 and the output voltage Vo become substantially equal may increase. As illustrated by a dash-single-dot line in FIG. 7A, the variations of the output voltage Vo with the variations of the input voltage Vi are reduced.

The output voltage Vo when the transistor T1 turns off becomes substantially equal to the reference voltage VR2, and the following equation is established.

$$Vo = VR0 - Vs2 + Vtv2 \quad (6)$$

When the amount of voltage change per unit time is c, the amount of voltage change $\Delta Vs2$ of the slope voltage Vs2 during the on-period of the transistor T1 is expressed by the following equation.

$$\Delta Vs2 = c \times Ton \quad (7)$$

The amount of voltage change $\Delta Vs2$ may correspond to the off-timing of the slope voltage Vs2 indicated by Equation 6. When the gain of the time-voltage conversion is d, the compensation voltage Vtv2 is expressed by the following equation.

$$Vtv2 = d \times Ton \quad (8)$$

By substituting Equation 7 and Equation 8 in Equation 6, the following equation is established.

$$Vo = VR0 - c \times Ton + d \times Ton$$

In the reference-voltage generation circuit 17, the amount of voltage change of the slope voltage Vs2 during the on-period of the transistor T1 may be set to be substantially equal to the voltage of the compensation voltage Vtv2 as follows.

$$c = d$$

The output voltage Vo may be expressed as follows.

$$Vo = VR0$$

The reference-voltage generation circuit 17 illustrated in FIG. 6 may have an effect which is substantially the same effect or similar to that of the reference-voltage generation circuit illustrated in FIG. 1.

Figure 8:
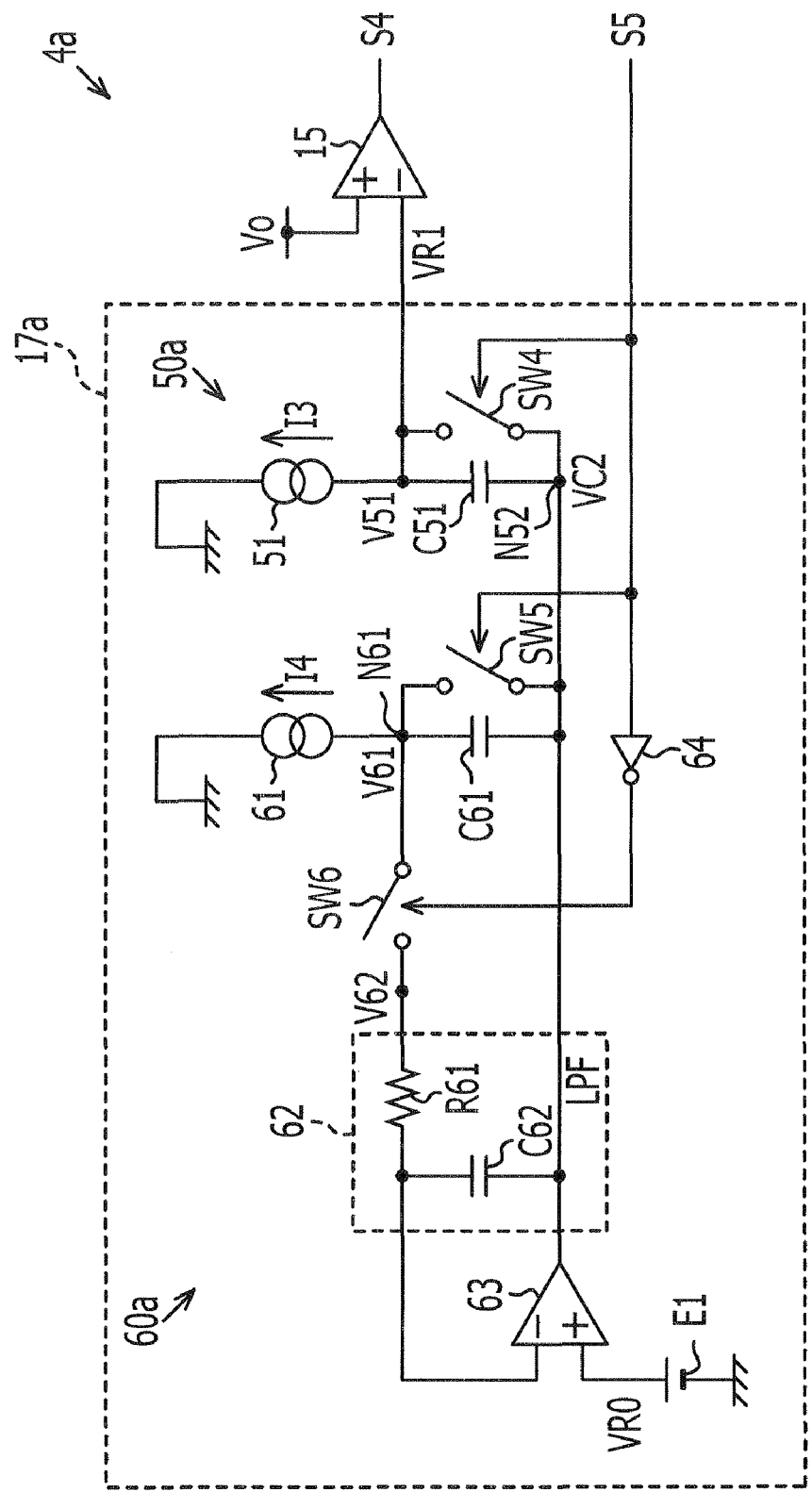
FIG. 8 illustrates an exemplary control circuit.

FIG. 8 illustrates an exemplary control circuit. A reference-voltage generation circuit 17a in the control circuit 4a illustrated in FIG. 8 includes a slope-voltage generation circuit 50a, and a compensation-voltage generation circuit 60a. The slope-voltage generation circuit 50a includes a current source 51, a capacitor C51, and a switch SW4. A constant current I3 flows from the current source 51. A first terminal of the current source 51 is coupled to ground, and a second terminal of the current source 51 is coupled to the first terminal of the capacitor C51. The second terminal of the capacitor C51 is coupled to the node N52. A switch SW4 is coupled in parallel with the capacitor C51.

The control terminal of the switch SW4 may be supplied with the control signal S5 output from the output terminal Q of the RS-FF circuit 16 illustrated in FIG. 6. The switch SW4 is turned off when the control signal S5 is a high level, and is turned on when the control signal S5 is a low level. The switch SW4 is turned off during the on-period of the main-side transistor T1, and is turned on during the off-period of the transistor T1. The switch SW4 may be turned on/off complementarily to the main-side transistor T1.

The compensation-voltage generation circuit 60a compensates the standard voltage VR0 for a voltage dependent on the on-time Ton of the transistor T1 to generate the compensated standard voltage VC2. The compensation-voltage generation circuit 60a includes a current source 61, a capacitor C61, switches SW5 and SW6, an LPF 62, an operational amplifier 63, an inverter circuit 64, and a standard power source E1. A constant current I4 having a current value substantially equal to that of the constant current I3 flows from the current source 61. A first terminal of the current source 61 is coupled to ground. A first terminal of the capacitor C61 is coupled to the second terminal of the current source 61. The second terminal of the capacitor C61 is coupled to a node N52. The capacitance of the capacitor C61 may be set to ½ the capacitance of the capacitor C51.

The switch SW5 is coupled in parallel with the capacitor C61. The control terminal of the switch SW5 is supplied with the control signal S5. The switch SW5 turns on and off in synchronization with the main-side transistor T1 in the same manner as the switch SW4.

A node N61 between the current source 61 and the capacitor C61 is coupled to the first terminal of the switch SW6. The second terminal of the switch SW6 is coupled to the first terminal of a resistor R61 in the LPF 62. The control terminal of the switch SW6 is supplied with the control signal S5 through the inverter circuit 64. The switch SW3 is turned on/off in synchronization with the main-side transistor T1.

The second terminal of the resistor R61 is coupled to the first terminal of the capacitor C62 and the inverting input terminal of the operational amplifier 63. The second terminal of the capacitor C62 is coupled to the output terminal of the operational amplifier 63. The non-inverting input terminal of the operational amplifier 63 is supplied with the standard voltage VR0, and the output terminal of the operational amplifier 63 is coupled to the node N52. The operational amplifier 63 changes the compensated standard voltage VC2 so that the voltage of the connection point between the resistor R61 and the capacitor C62 becomes substantially equal to the standard voltage VR0.

Figure 9:
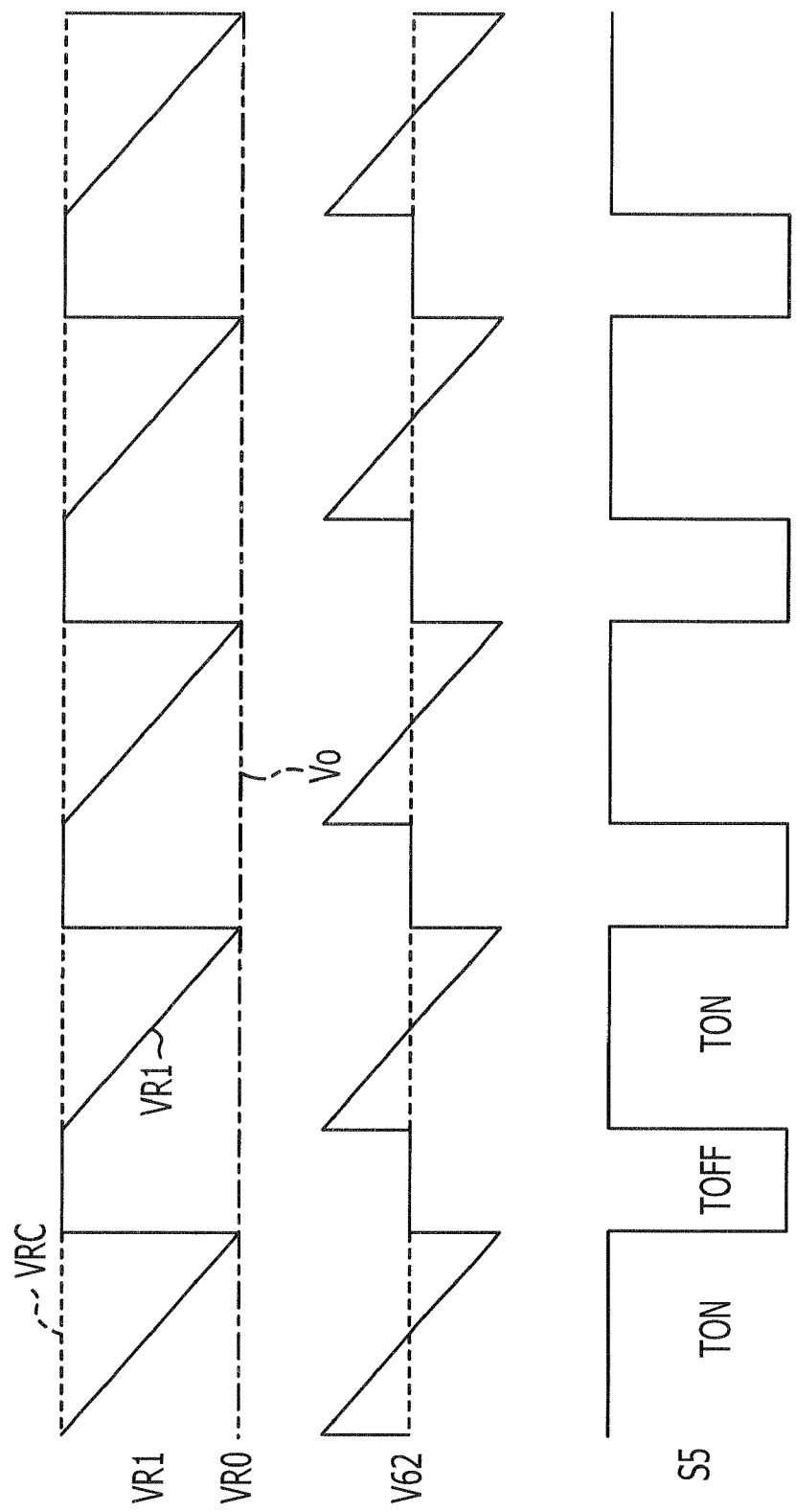
FIG. 9 illustrates an exemplary operation of a reference-voltage generation circuit.

FIG. 9 illustrates an exemplary operation of a reference-voltage generation circuit. The reference-voltage generation circuit 17a illustrated in FIG. 8 may perform the operation illustrated in FIG. 9. The reference voltage VR2 during the on-period of the transistor T1 may be expressed by the following equation.

$$VR2 = VC2 - \frac{I3}{C51} \times Ton \quad (9)$$

The reference voltage VR2 decreases from the compensated standard voltage VC2 at a certain slope, for example, I3/C51 during the on-period (refer to FIG. 9). The voltage of the second term on the right side of Equation 9 may correspond to the slope voltage Vs2. The compensated standard voltage VC2 may be expressed by the following equation.

$$VC2 = VR0 + \left(\frac{I4}{C61} \times \text{Ton}\right) \quad (10)$$

The compensated standard voltage VC2 is dependent on the on-time Ton of the transistor T1. The LPF 62 smoothes the voltage V62 decreasing at a certain slope during the on-period, for example, I4/C61, and holds the smoothed input voltage V62 during the-off period (refer to FIG. 9). For example, the voltage dependent on the on-time Ton of the transistor T1 is fed back to the operational amplifier 63. The voltage of the second term on the right side of Equation 10 may correspond to the compensation voltage Vtv2.

The output voltage Vo when the transistor T1 turns off becomes substantially equal to the reference voltage VR1, and may be expressed by the following expression using Equation 9 and Equation 10.

$$Vo = VR0 + \left(\frac{I4}{2 \times C61} \times \text{Ton}\right) - \left(\frac{I3}{C51} \times \text{Ton}\right)$$

In the reference-voltage generation circuit 17a, the setting may be as follows.

$$C61 = \frac{1}{2} \times C51$$
$$I3 = I4$$

The output voltage Vo may be expressed as follows.

$$Vo = VR0$$

The reference-voltage generation circuit 17a illustrated in FIG. 8 may have an effect which is substantially the same as or similar to that of the reference-voltage generation circuit 12 illustrated in FIG. 1.

A slope voltage Vs1 and a compensation voltage Vtv1 are added to the standard voltage VR0 side. For example, the slope voltage Vs1 may be added to the output voltage Vo side, and the compensation voltage Vtv1 may be added to the standard voltage VR0 side.

Figure 10:
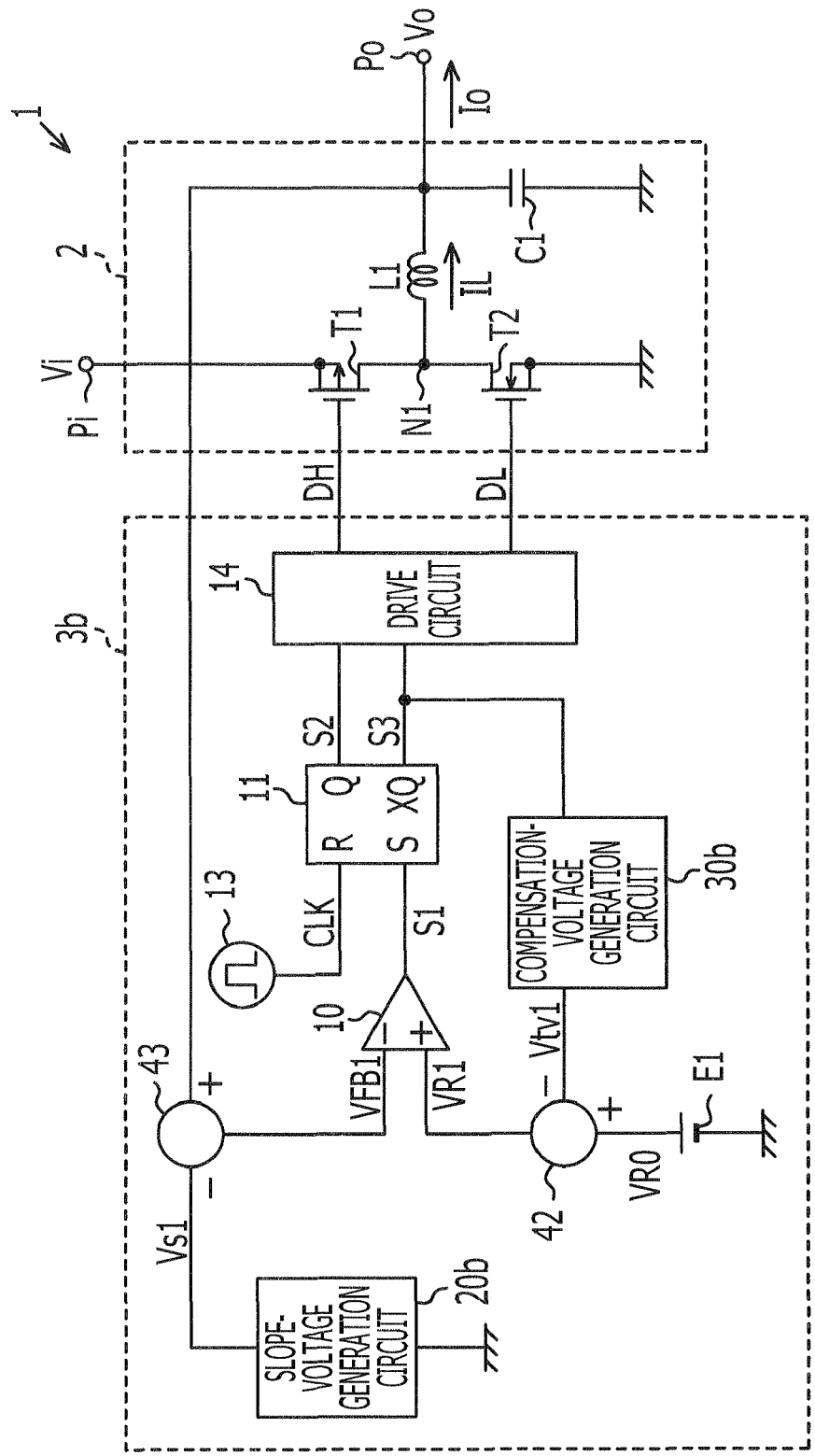
FIG. 10 illustrates an exemplary DC-DC converter.

FIG. 10 illustrates an exemplary DC-DC converter. The control circuit 3b illustrated in FIG. 10 includes a slope-voltage generation circuit 20b, a compensation-voltage generation circuit 30b, and subtraction circuits 42 and 43. The slope-voltage generation circuit 20b generates the slope voltage Vs1 in the same manner as the slope-voltage generation circuit 20. The compensation-voltage generation circuit 30b generates the compensation voltage Vtv1 in the same manner as the compensation-voltage generation circuit 30.

The subtraction circuit 42 subtracts the compensation voltage Vtv1 from the standard voltage VR0 to generate the reference voltage VR1. The subtraction circuit 43 subtracts the slope voltage Vs1 from the output voltage Vo to generate the feedback voltage VFB1. The comparator 10 compares the reference voltage VR1 and the feedback voltage VFB1 to output a signal S1 corresponding to the comparison result. Since the compensation voltage Vtv1 is subtracted from the standard voltage VR0, for example since a dependence of the feedback voltage VFB1 when it becomes substantially equal to the reference voltage VR1, for example, the output voltage V0 on the off time Toff is canceled, an effect which is substantially the same as or similar to that of the circuit illustrated in FIG. 1 may be obtained.

The slope voltage Vs1 may be added to the standard voltage VR0 side to generate the reference voltage VR1, and the compensation voltage Vtv1 may be added to the output voltage Vo side to generate the feedback voltage VFB1. The standard voltage VR0 may be set to the reference voltage VR1, and the compensation voltage Vtv1 and the slope voltage Vs1 may be added to the output voltage Vo side to generate the feedback voltage VFB1.

The slope voltage Vs2 and the compensation voltage Vtv2 are added to the standard voltage VR0 side. For example, the slope voltage Vs2 may be added to the output voltage Vo side, and the compensation voltage Vtv2 may be added to the standard voltage VR0 side.

Figure 11:
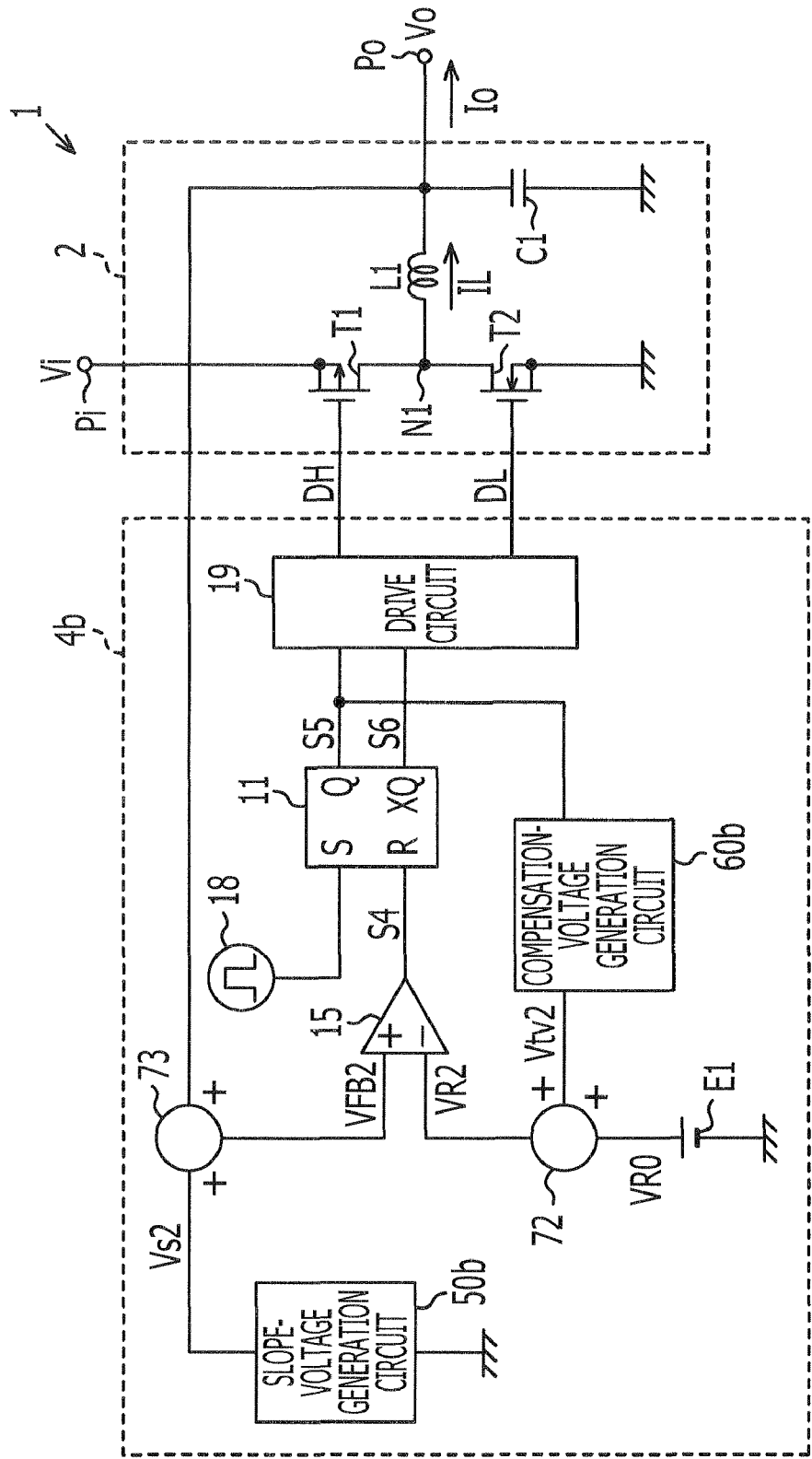
FIG. 11 illustrates an exemplary DC-DC converter.

FIG. 11 illustrates an exemplary DC-DC converter. The control circuit 4b includes a slope-voltage generation circuit 50b, a compensation-voltage generation circuit 60b, and addition circuits 72 and 73. The slope-voltage generation circuit 50b generates, for example, the slope voltage Vs2 in the same manner as the slope-voltage generation circuit 50 illustrated in the FIG. 6. The compensation-voltage generation circuit 60b generates, for example, the compensation voltage Vtv2 in the same manner as compensation-voltage generation circuit 60 illustrated in FIG. 6.

The addition circuit 72 adds the compensation voltage Vtv2 to the standard voltage VR0 to generate the reference voltage VR2. The addition circuit 73 adds the slope voltage Vs2 to the output voltage Vo to generate the feedback voltage VFB2. The comparator 10 compares the reference voltage VR2 and the feedback voltage VFB2 to output a signal S4 corresponding to the comparison result. Since the compensation voltage Vtv2 is added to the standard voltage VR0, a dependence of the feedback voltage VFB2 when it becomes substantially equal to the reference voltage VR2, for example, the output voltage Vo on the on time Ton is canceled, an effect which is substantially the same as or similar to that of the DC-DC converter illustrated in FIG. 6 may be obtained.

The slope voltage Vs2 may be added to the standard voltage VR0 side to generate the reference voltage VR2, and the compensation voltage Vtv2 may be added to the output voltage Vo side to generate the feedback voltage VFB2. The standard voltage VR0 may be set to the reference voltage VR2, and the compensation voltage Vtv2 and the slope voltage Vs2 may be added to the output voltage Vo side to generate the feedback voltage VFB2.

The voltage at the output-voltage Vo side to which the compensation voltages Vtv1 and Vtv2 or the slope voltages Vs1 and Vs2 are added may be a voltage in accordance with the output voltage Vo, for example, a divided voltage of the output voltage Vo, etc.

The reference-voltage generation circuits 12 and 12a are supplied with the control signal S3. The reference-voltage generation circuits 12 and 12a may be supplied with a signal corresponding to the off-period or the-on period of the main-side transistor T1. For example, the control signal DL illustrated in FIG. 1, the control signal S2, a signal obtained by logically inverting the control signal DH, or the voltage of the node N1 may be supplied.

The reference-voltage generation circuits 17 and 17a are supplied with the control signal S5. A signal corresponding to the on-period or the off-period of the main-side transistor T1 may be supplied to the reference-voltage generation circuits 17 and 17a. For example, the control signal DH or the control signal S6 illustrated in FIG. 6, a signal obtained by logically inverting the control signal DL, or the voltage of the node N1 may be supplied.

The transistor T1 turns off based on the high-level clock signal CLK which rises in a certain cycle. For example, the transistor T1 may turn off after a certain time elapses from the rising of the output signal S1 of the comparator 10, for example, the on-timing of the transistor T1. For example, in place of the oscillator 13, a timer circuit, which outputs the high-level pulse signal to the reset terminal R of the RS-FF circuit 11 after a lapse of a time period depending on the input voltage Vi or the output voltage Vo from the rising of the output signal S1, may be disposed. In place of the RS-FF circuit 11 and the oscillator 13, one-shot flip-flop circuit may be disposed.

The transistor T1 turns on in accordance with the high-level clock signal CLK which rises in a certain cycle. For example, the transistor T1 may turn on after a certain time elapses from the rising of the output signal S4 of the comparator 15, for example, the off-timing of the transistor T1.

The slope voltages Vs1 and Vs2 or the compensation voltages Vtv1 and Vtv2 may vary dependently on the input voltage V1 or the output voltage Vo, etc. For example, the bias voltage VB may depend on the input voltage Vi or the output voltage Vo, etc.

The switch circuit may include a P-channel MOS transistor or an N-channel MOS transistor. The switch circuit may include a bipolar transistor, and also may include a plurality of transistors.

The standard voltage VR0 may be generated outside the control circuit 3, 3a, 3b, 4, 4a, or 4b. The transistors T1 and T2 may be included in each of the control circuits 3, 3a, 3b, and 4, or 4a, and 4b. The converter unit 2 may be included in each of the control circuit 3, 3a, 3b, 4, 4a, or 4b.

The above-described aspects may be applied to a synchronous rectification type DC-DC converter, and also may be applied to an asynchronous rectification type DC-DC converter.

Example aspects of the present invention have now been described in accordance with the above advantages. It will be appreciated that these examples are merely illustrative of the invention. Many variations and modifications will be apparent to those skilled in the art.

The invention claimed is:

1. A power source apparatus comprising:
a switch circuit to receive an input voltage;
a control circuit to switch the switch circuit from a second state to a first state at a timing corresponding to a comparison result between a feedback voltage generated based on a first voltage corresponding to an output voltage and a reference voltage generated based on a standard voltage set in accordance with the output voltage; and
a voltage generation circuit to add a compensation voltage generated by voltage-converting a time period in which the switch circuit switches from the second state to the first state to one of the first voltage and the standard voltage, to generate the feedback voltage, to add a slope voltage which changes at a slope to one of the first voltage and the standard voltage, and to generate the reference voltage.

2. The power source apparatus according to claim 1, wherein the control circuit switches the switch circuit from the first state to the second state based on a condition.

3. The power source apparatus according to claim 1, wherein the voltage generation circuit generates the compensation voltage which is substantially the same as an amount of change of the slope voltage during the time period.

4. The power source apparatus according to claim 1, wherein the control circuit activates the switch circuit at a timing corresponding to the comparison result, and
the voltage generation circuit generates the compensation voltage which is substantially the same as an amount of change of the slope voltage during a non-active period of the switch circuit, and generates the reference voltage by adding the slope voltage to the standard voltage and subtracting the compensation voltage from an addition result.

5. The power source apparatus according to claim 1, wherein the voltage generation circuit includes a slope-voltage generation circuit including
a first capacitor, a first switch coupled in parallel with the first capacitor, and a first power source to supply a current to the first capacitor.

6. The power source apparatus according to claim 5, wherein the slope-voltage generation circuit controls the first switch in accordance with a switching timing of the switch circuit to charge and discharge the first capacitor, and generates the slope voltage based on a charge of the first capacitor.

7. The power source apparatus according to claim 1, wherein the voltage generation circuit includes a compensation-voltage generation circuit including a second capacitor, a second switch coupled in parallel with the second capacitor, a second power source to supply a current to the second capacitor, a low-pass filter coupled between a first terminal and a second terminal of the second capacitor via a third switch, and an operational amplifier to receive a voltage of the first terminal of the second capacitor and the standard voltage via the low-pass filter and to have an output terminal coupled to the second terminal of the second capacitor.

8. The power source apparatus according to claim 7, wherein the compensation-voltage generation circuit controls the second switch in synchronization with the switch circuit, controls the third switch complementarily to the switch circuit, and generates an output voltage of the operational amplifier obtained by subtracting the compensation voltage from the standard voltage.

9. The power source apparatus according to claim 1, wherein the control circuit turns off the switch circuit at a timing corresponding to the comparison result, and
the voltage generation circuit generates the compensation voltage, which is substantially the same voltage as a change amount of the slope voltage, during an on-period of the switch circuit, and generates the reference voltage by subtracting the slope, voltage from the standard voltage and adding the compensation voltage to the subtraction result.

10. The power source apparatus according to claim 1, wherein the control circuit switches the switch circuit from the first state to the second state based on a pulse signal having a frequency, or switches the switch circuit from the first state to the second state after a lapse of a time period from switching the switch circuit to the first state.

11. A method of controlling a power source apparatus, the method comprising:
supplying an input voltage to a switch circuit;
switching the switch circuit from a first state to a second state based on a condition;

comparing a feedback voltage generated based on a first voltage corresponding to an output voltage with a reference voltage generated based on a standard voltage set in accordance with the output voltage;

switching the switch circuit from the second state to the first state at a timing based on a comparison result;

generating a compensation voltage by voltage-converting a time period from when the switch circuit switches to the second state to when the switch circuit switches to the first state;

generating a slope voltage which changes at a slope;

generating the feedback voltage by adding the compensation voltage to one of the first voltage and the standard voltage; and generating the reference voltage by adding the slope voltage to one of the first voltage and the standard voltage.

12. The method of controlling a power source apparatus according to claim 11, further comprising, switching the switch circuit from the first state to the second state based on the condition.

* * * * *